United States Patent [19]
Tanet et al.

[11] 3,883,167
[45] May 13, 1975

[54] DEVICES FOR ABSORBING ENERGY BY PLASTIC DEFORMATION

[75] Inventors: Bernard Tanet; Bernard Elias, both of Billancourt, France

[73] Assignees: Regie Nationale des Usines Renault, Billancourt (Hautes de Seine); Automobiles Peugeot, Paris, both of France

[22] Filed: Apr. 5, 1973

[21] Appl. No.: 348,094

[30] Foreign Application Priority Data
Apr. 13, 1972 France .............................. 72.13022

[52] U.S. Cl. ...................... 293/70; 188/1 C; 74/492
[51] Int. Cl. ...................... B60r 19/02; G01p 15/06
[58] Field of Search ....... 188/1 C; 213/1 A; 74/492, 74/493; 293/1, 60, 70, 89

[56] References Cited
UNITED STATES PATENTS
| | | |
|---|---|---|
| 3,373,630 | 3/1968 | Heurtebise .......................... 188/1 C |
| 3,412,628 | 11/1968 | DeGain .............................. 188/1 C |
| 3,486,395 | 12/1969 | Yoshioka ............................ 188/1 C |
| 3,691,865 | 9/1972 | McElwain ............................ 74/492 |

*Primary Examiner*—Evon C. Blunk
*Assistant Examiner*—Robert Saifer
*Attorney, Agent, or Firm*—Stevens, Davis, Miller & Mosher

[57] ABSTRACT

This invention relates to an energy-absorbing device of the kind comprising two sets of plastically-deformable divergent elements rigidly fixed to each other, and two anchorages adapted to be brought closer together under the action of a load. The deformable elements of said device are curved back towards the exterior and are coupled to each other, at least in pairs, said anchorages being separated by said two sets of elements, and located at the junction of at least two elements of the same set.

6 Claims, 11 Drawing Figures

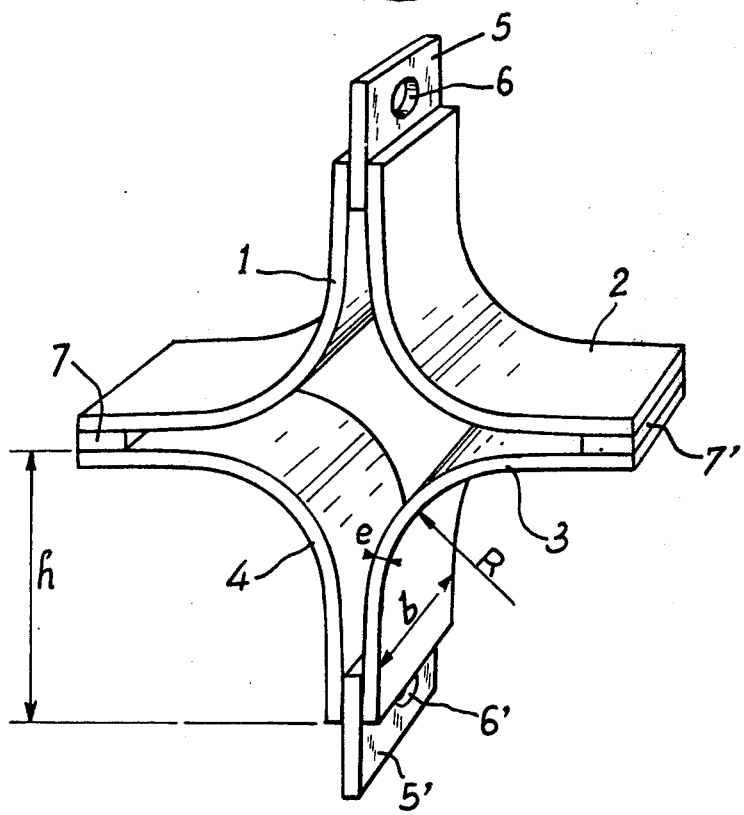
Fig. 1
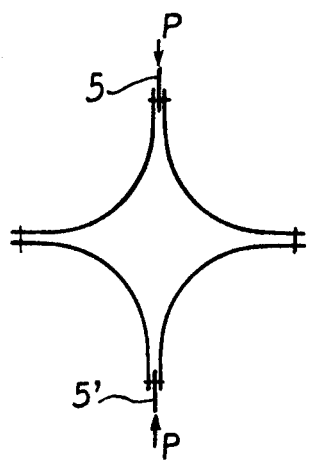
Fig. 2
Fig. 3

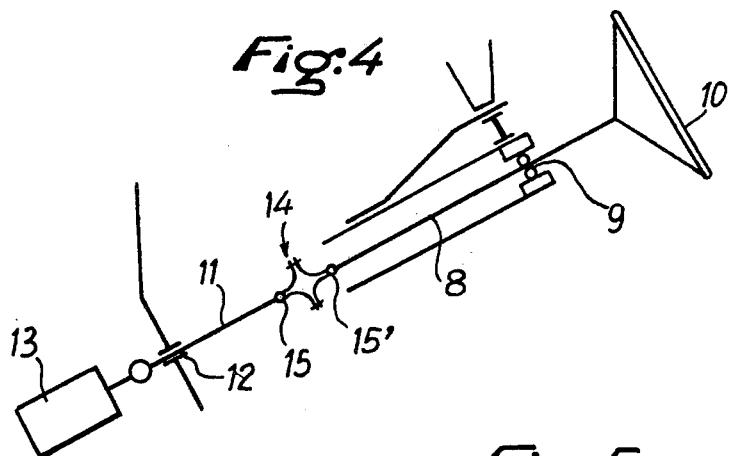
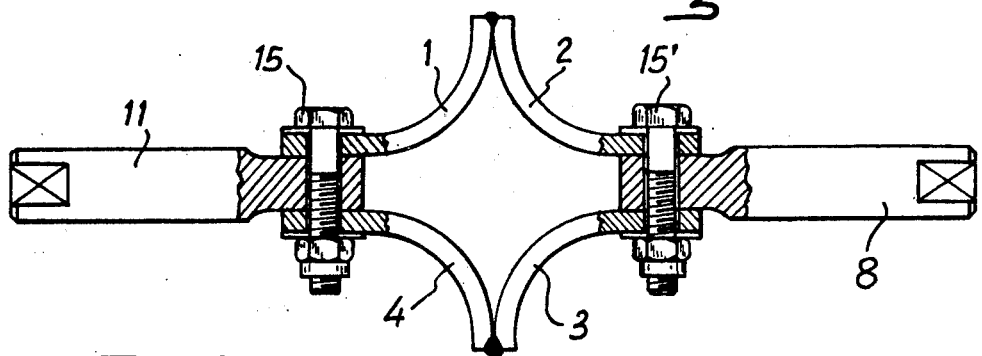
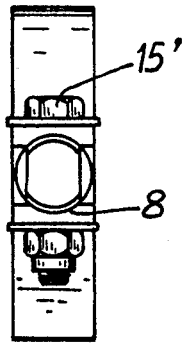
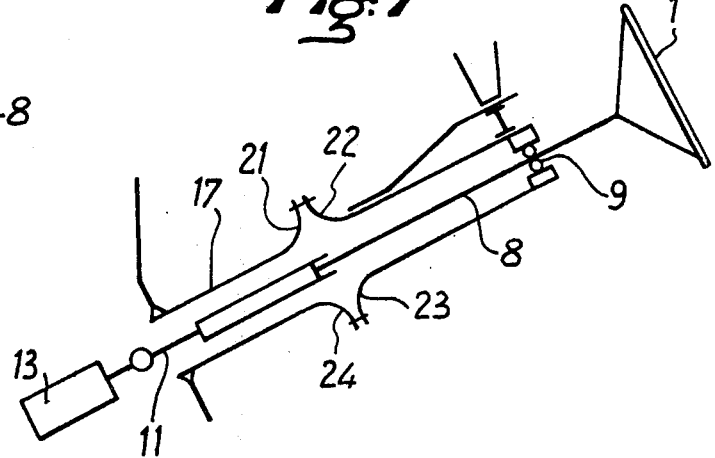

DEVICES FOR ABSORBING ENERGY BY PLASTIC DEFORMATION

The present invention relates to devices for the absorption of energy by plastic deformation which apply a damping effect of the impact forces without elastic return effect after the damping of the impact forces, and which are employed in particular on automobile vehicles.

Various absorber devices of mechanical energy by plastic deformation are already known, applied to a point on the steering column, to the fixing points of the seats, to the mounting of the bumpers, etc... These devices are all constructions which necessitate the combination of a certain number of elements and, for this reason, they are presented in forms, the volume of which is not negligible and is sometimes very bulky. In addition, their production cost is fairly high.

The present invention has especially for its object an energy-absorber device by plastic deformation which is of simple construction, has a small bulk and a relatively-low production cost.

The invention has also for its object an energy-absorber device to which there may be applied a force which is kept between certain imposed limits, and in which the plastic deformation can be obtained under a practically-constant load.

The invention has also for its object a device capable of absorbing a large quantity of energy with a relatively small force ensuring the absorption of energy during the deformation of the device.

Absorber devices have already been produced which make use of the plastic properties of the material, and which utilize ductile materials of suitable strength.

The materials employed, such as mild steel, are fragile and not very resistant to wear, and the synthetic materials intended to replace the metal have physical characteristics which are variable with time.

In order to remedy this drawback, the various sections of the energy absorber according to the invention are subjected to plastic deformation. The absorber is uniform over its entire travel and its resistance to deformation remains constant.

When this energy absorber is employed in the automobile industry, for example on the steering column or on a bumper, the energy developed during the collision may be effectively absorbed while reducing the bad effects of the shock and diminishing the risk of serious injury and damage. In shock-absorber devices with springs or flexible blades, utilizing the elasticity of the material itself, the energy of the collision is stored in the form of compression force and, when the movement is stopped, this energy is liberated and may aggravate the effects of the accident.

On the other hand, the energy absorber according to the invention applies a damping action by dissipating the energy in the form of plastic deformation of the material, as has previously been seen, and in view of the fact that no elastic return is produced, safety of use is greatly improved.

According to the invention, the energy absorber device by plastic deformation comprises at least two sets of two plastically deformable elements, incurved and fixed to each other in such manner as to form two divergent portions which are anchored at least in pairs on two members tending to be brought closer to each other by the effect of a load.

The device may be made from elements of thick steel sheets and finds its application both as a fixing member and as a support for a body component, such as a bumper, and it is capable of absorbing compression forces due especially to the inertia of the vehicle stopped by an obstacle.

The device may also be incorporated in the shaft of a steering column, in which it can ensure simultaneously the transmission of the rotational torque applied to the steering wheel and the safety of the driver during a collision. In this latter case, the device prevents the backward movement of the steering shaft into the vehicle interior and dissipates the energy due to the shock of the driver against the steering-wheel.

In this case of use, the device enables the maximum value of the force due to the impact of the driver on the steering-wheel to be reduced, since the device works correctly under the action of forces, even of small magnitude.

Other characteristic features and advantages of the invention will also become apparent from examination of the description which follows below, given by way of example with reference to the accompanying drawings, in which:

FIG. 1 represents a perspective view of an energy-absorber comprising two sets of two elements;

FIG. 2 shows diagrammatically the energy-absorber in the state of rest;

FIG. 3 shows diagrammatically the energy-absorber in the state of deformation;

FIG. 4 shows a method of use of the energy absorber;

FIG. 5 shows in cross-section the detail of the energy-absorber which is shown in FIG. 4;

FIG. 6 is a side view of the energy-absorber such as shown in FIG. 5;

FIG. 7 represents a further method of use of the energy-absorber;

Figure 8:
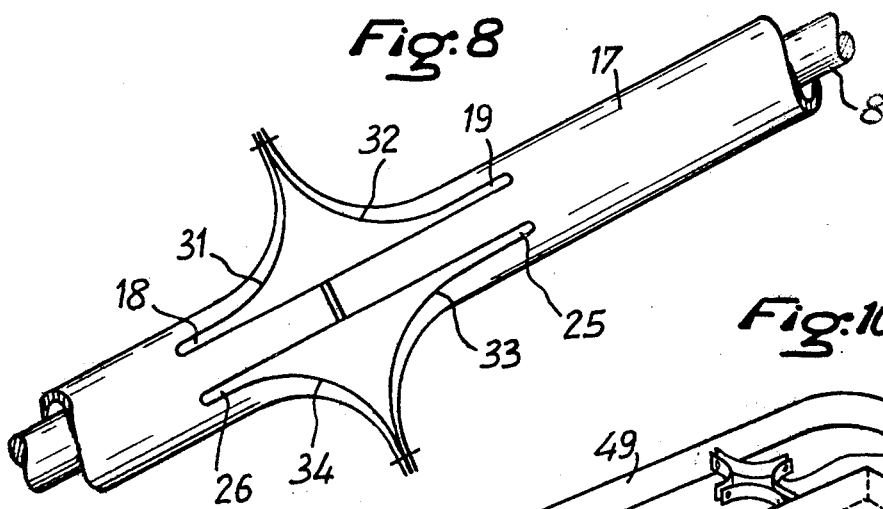
FIG. 8 shows a third method of use of the energy-absorber.

According to FIG. 1, the device 1 comprises two sets of identical plastically-deformable elements 1, 2, 3 and 4, of a material such as mild steel, aluminium, copper or certain synthetic materials.

The elements 1, 2, 3 and 4 are incurved and rigidly fixed to each other in pairs at their extremities. They are fixed together for example by welding, glueing, or by means of screws, rivets, etc. . .

The incurved elements 1 and 2 which form a first set have their adjacent extremities stuck on a plate 5, of which the free portion is provided with an orifice 6 serving for the mounting of the energy-absorber on a member. In the same way, the incurved elements 3 and 4 which constitute the second set are fixed to the base of a plate 5', the visible portion of which has an orifice 6'.

The elements 1 and 4 and the elements 2 and 3 are respectively welded at 7 and 7'.

There is shown diagrammatically in FIG. 2 the form of the energy-absorber at the moment when the plates 5 and 6 are subjected to the action of two oppositelyacting forces P, and in FIG. 3, the same absorber is shown in course of deformation under the sustained effect of the two forces P.

In FIG. 4, the steering column shown comprises an upper articulated section 8 movable in the bearing 9 and associated with the steering-wheel 10, a lower articulated section 11 movable in the bearing 12 and associated with the steering-box 13.

An energy-absorber 14 is placed between the two articulated sections 8 and 11. The fixing is effected at the level of the orifices 6 and 6' by articulation axes 15 and 15' which are shown in detail in FIGS. 5 and 6.

According to the form of embodiment shown in FIG. 7, the energy-absorber is not mounted on the steering column itself, but on the tubular support 17 which protects the column.

The incurved forms 21, 22, 23 and 24 are similar to the forms 1, 2, 3 and 4 described with reference to FIG. 1. In this case, there are provided two sets of two elements.

According to the form of embodiment shown in FIG. 8, the supporting tube 17 which protects the steering column 8 has been equipped with four pairs of elements rigidly fixed to two coaxial parts of the tubular support.

In FIG. 8, only two of these can be seen, the other two being hidden by the tubular support 17. The first visible set comprises two elements which form cut-out tongues 32 and 33, and the second visible set also comprises two cut-out tongues 31 and 34 which are rigidly fixed on the support 17. The support 17 is provided for that purpose with grooves 18, 19 and 25, 26. The tongues 31, 34 of the second set are fixed to the tongues 32, 33 of the first set in a plane substantially perpendicular to the axis of the support 17.

Figure 9:
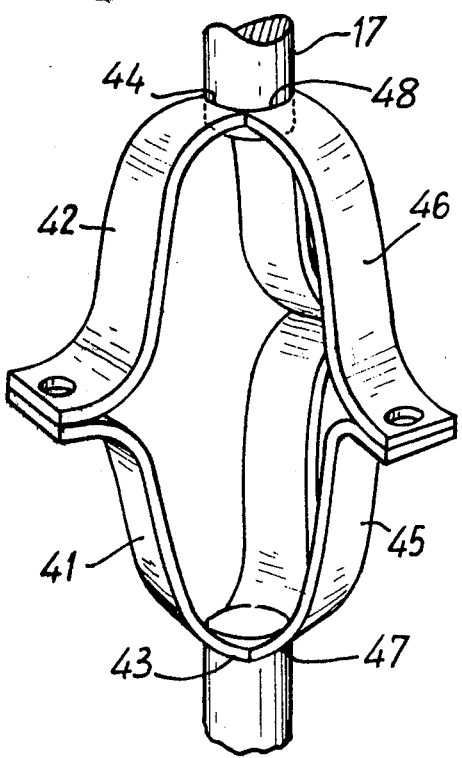
FIG. 9 shows an energy-absorber having two sets of three elements.

An alternative form of this device is shown in FIG. 9, in which the energy-absorber comprises three pairs of elements; a first pair comprises the incurved elements 41, 42 which are anchored at 43, 44, a second pair comprises the incurved elements 45, 46 anchored at 47, 48, and a third pair which can only be partly seen behind the second set.

Figure 10:
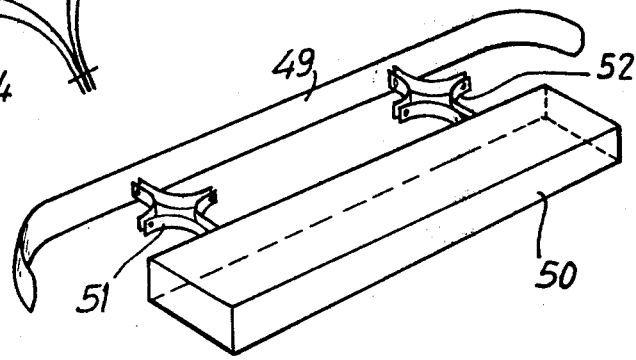
FIG. 10 represents the mounting of an energy-absorber on a bumper.

The bumper 49 which is shown in FIG. 10 is mounted on the chassis 50 of a vehicle by means of two absorbers 51 and 42 of the same type as that shown in FIG 1.

The radius of curvature R, the thickness e, the width b, and the height h which are shown in FIG. 1 constitute some of the parameters which determine the shape of the operating curve of the energy-absorber.

When the absorber is subjected to a compression force, the whole unit is first slightly deformed, and then the curved portion of the elements of the device continues to be deformed during the whole period of application of the force P.

Figure 11:
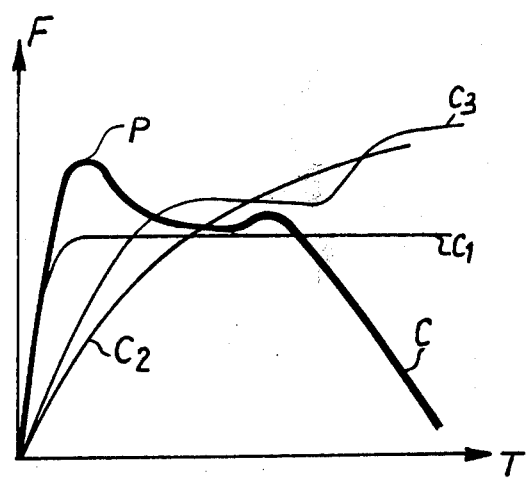
FIG. 11 represents several examples of curves showing the variations of the force F, resistance to deformation of the energy-absorber as a function of time.

According to the choice of the various parameters referred to above, there are obtained, as shown in FIG. 11, curves of variation of force F as a function of time T, such a C1, C2 and C3. These curves which are of rising values do not have a peak value P such as is the case for the curve C.

What we claim is:

1. An energy-absorbing device comprising two sets of plastically-deformable tongues, each tongue of a set diverging from each other tongue thereof, said sets being rigidly fixed to each other and two anchorages at the ends of the tongues adapted to be brought closer together under the action of a load, the interior surface of each tongue of each set adjacent its respective anchorage facing the interior surfaces of the other tongues of its respective set, in which the deformable tongues of said device are incurved and are coupled to each other, at least in pairs, and in which said anchorages are separated by said two sets of tongues, and are located at the junction of at least two tongues of the same set.

2. A device as claimed in claim 1, in which said anchorages are further provided respectively with articulation shafts.

3. A device as claimed in claim 1, in which said anchorages are respectively fixed to an element of the fender and of the chassis of an automobile vehicle.

4. A device as claimed in claim 2, in which said anchorages are respectively fixed on two separate sections of an operating shaft of the steering mechanism of an automobile vehicle.

5. A device as claimed in claim 1, in which said anchorages are respectively fixed on two separate sections of a steering column of an automobile vehicle.

6. An energy-absorbing device as claimed in claim 1, wherein the said two anchorages are constituted by two separate coaxial sections of a supporting tube adapted to surround and protect a steeering column of an automobile, each coaxial section having an end forming a set of said incurved tongues, longitudinal grooves separating said tongues, each tongue of one coaxial section being affixed to a, corresponding one of the tongues of the second coaxial section in the same plane substantially perpendicular to the axis of said supporting tube.

* * * * *